US010931175B2

(12) United States Patent
Gassend et al.

(10) Patent No.: US 10,931,175 B2
(45) Date of Patent: Feb. 23, 2021

(54) MAGNET RING WITH JITTERED POLES

(71) Applicant: Waymo LLC, Mountain View, CA (US)

(72) Inventors: Blaise Gassend, East Palo Alto, CA (US); Samuel Lenius, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 84 days.

(21) Appl. No.: 16/235,294

(22) Filed: Dec. 28, 2018

(65) Prior Publication Data

US 2020/0136476 A1 Apr. 30, 2020

Related U.S. Application Data

(60) Provisional application No. 62/753,446, filed on Oct. 31, 2018.

(51) Int. Cl.
*H02K 11/215* (2016.01)
*H02K 1/27* (2006.01)
(Continued)

(52) U.S. Cl.
CPC ............ *H02K 11/215* (2016.01); *H02K 1/12* (2013.01); *H02K 1/2793* (2013.01); *H02K 11/30* (2016.01); *H02K 26/00* (2013.01)

(58) Field of Classification Search
CPC ........ H02K 11/215; H02K 26/00; H02K 1/12; H02K 11/30; H02K 1/2793
See application file for complete search history.

(56) References Cited

U.S. PATENT DOCUMENTS 3,790,277 A 2/1974 Hogan
4,396,875 A 8/1983 Yamauchi
(Continued)

FOREIGN PATENT DOCUMENTS

EP 1655820 5/2006
EP 2377230 10/2011
(Continued)

OTHER PUBLICATIONS

International Searching Authority, International Search Report and Written Opinion dated Feb. 14, 2020, issued in connection with International Patent Application No. PCT/US2019/057816, filed on Oct. 24, 2019, 12 pages.
(Continued)

*Primary Examiner* — Akm Zakaria
(74) *Attorney, Agent, or Firm* — McDonnell Boehnen Hulbert & Berghoff LLP

(57) ABSTRACT

An apparatus includes a first platform and a second platform configured to rotate relative to the first platform about an axis. A magnet ring is mounted to the first platform and centered around the axis. The magnet ring includes four or more magnetized poles positioned such that each respective boundary between neighboring poles is shifted relative to a corresponding nominal boundary defined by a uniform spacing of boundaries of the poles around the magnet ring. The shifted boundaries of the poles define a characteristic shift pattern for the magnet ring. A magnetic field sensor is connected to the second platform. Circuitry is configured to (i) determine a magnetic field pattern generated by the poles based on data generated by the sensor and (ii) determine a rotational position of the first platform relative to the second platform by correlating the magnetic field pattern to the characteristic shift pattern.

20 Claims, 8 Drawing Sheets

(51) Int. Cl.
*H02K 26/00* (2006.01)
*H02K 11/30* (2016.01)
*H02K 1/12* (2006.01)

(56) References Cited

U.S. PATENT DOCUMENTS

| | | | |
|---|---|---|---|
| 4,529,934 A | 7/1985 | Heinrich | |
| 4,658,162 A | 4/1987 | Koyama et al. | |
| 4,700,301 A | 10/1987 | Dyke | |
| 4,709,195 A | 11/1987 | Hellekson et al. | |
| 4,733,115 A | 3/1988 | Barone et al. | |
| 5,202,742 A | 4/1993 | Frank et al. | |
| 5,239,263 A | 8/1993 | Iwata et al. | |
| 5,469,033 A | 11/1995 | Huang | |
| 5,498,919 A | 3/1996 | Bahn | |
| 5,644,225 A | 7/1997 | Alfors et al. | |
| 5,796,194 A | 8/1998 | Archer et al. | |
| 5,866,962 A | 2/1999 | Kim | |
| 6,049,182 A | 4/2000 | Nakatani et al. | |
| 6,051,943 A | 4/2000 | Rabin et al. | |
| 6,400,143 B1 | 6/2002 | Travostino et al. | |
| 6,998,757 B2 | 2/2006 | Seguchi et al. | |
| 7,089,114 B1 | 8/2006 | Huang | |
| 7,183,734 B2 | 2/2007 | Lassen | |
| 7,248,342 B1 | 7/2007 | Degnan | |
| 7,255,275 B2 | 8/2007 | Gurevich et al. | |
| 7,265,685 B2 | 9/2007 | Legrand | |
| 7,969,558 B2 | 6/2011 | Hall | |
| 8,823,241 B2 | 9/2014 | Jore et al. | |
| 8,946,952 B2 | 2/2015 | Bi et al. | |
| 9,059,649 B1 | 6/2015 | Droz et al. | |
| 9,771,096 B2 | 9/2017 | Hino et al. | |
| 2002/0175582 A1 | 11/2002 | Lopatinsky et al. | |
| 2003/0020353 A1 | 1/2003 | Lopatinsky et al. | |
| 2004/0189130 A1 | 8/2004 | Hovanky et al. | |
| 2005/0001580 A1 | 1/2005 | Dorner | |
| 2006/0055265 A1 | 3/2006 | Zalusky | |
| 2006/0066282 A1 | 3/2006 | Soeda | |
| 2006/0220491 A1 | 10/2006 | Takeuchi et al. | |
| 2006/0267427 A1* | 11/2006 | Matsubara | H02K 7/063 310/81 |
| 2007/0228864 A1 | 10/2007 | Graham et al. | |
| 2008/0106259 A1 | 5/2008 | Stuve | |
| 2008/0252285 A1 | 10/2008 | Passwater et al. | |
| 2008/0290862 A1 | 11/2008 | Legrand et al. | |
| 2010/0067085 A1 | 3/2010 | Bernstein et al. | |
| 2012/0043862 A1 | 2/2012 | Furukawa et al. | |
| 2012/0306604 A1* | 12/2012 | Fullerton | H01F 7/02 335/306 |
| 2013/0009508 A1 | 1/2013 | Takamatsu et al. | |
| 2016/0069710 A1* | 3/2016 | Ausserlechner | G01D 5/20 324/207.23 |
| 2016/0197573 A1 | 7/2016 | Iwata et al. | |
| 2018/0123412 A1 | 5/2018 | Karplus et al. | |
| 2018/0212489 A1 | 7/2018 | Schuler et al. | |
| 2019/0074751 A1* | 3/2019 | Chen | H02P 6/16 |

FOREIGN PATENT DOCUMENTS

| | | |
|---|---|---|
| GB | 2485185 | 5/2012 |
| JP | 59139850 | 8/1984 |
| JP | 60125143 | 7/1985 |
| JP | 61210849 | 9/1986 |
| JP | 2012120423 | 6/2012 |
| WO | 2003003547 | 1/2003 |
| WO | 2004073365 | 8/2004 |
| WO | 2011006515 | 1/2011 |

OTHER PUBLICATIONS

Ruben, ECEE4638 Control Systems Lab Manual, University of Colorado Electrical, Computer, and Energy Engineering, Aug. 21, 2011, http://ecee.colorado.edu/shalom/ecee4638/ecee4638manual.pdf.

International Searching Authority, International Search Report and Written Opinion of the International Searching Authority dated Dec. 12, 2017, issued in connection with International Application No. PCT/US2017/053515, filed on Sep. 26, 2017.

Kazuya Shirahata, Speed Control Methods of Various Types of Speed Control Motors, Oriental Motor, retrieved on Nov. 27, 2018.

* cited by examiner

| TRANSITION | NOMINAL TRANSITION ANGLE (DEGREES) | SHIFT (DEGREES) | ACTUAL TRANSITION ANGLE (DEGREES) | POLE SIZE (DEGREES) |
|---|---|---|---|---|
| 1. 316 to 302 | 0 | +1 | 1 | 43 |
| 2. 302 to 304 | 45 | -1 | 44 | 47 |
| 3. 304 to 306 | 90 | +1 | 91 | 45 |
| 4. 306 to 308 | 135 | +1 | 136 | 43 |
| 5. 308 to 310 | 180 | -1 | 179 | 45 |
| 6. 310 to 312 | 225 | -1 | 224 | 47 |
| 7. 312 to 314 | 270 | +1 | 271 | 45 |
| 8. 314 to 316 | 315 | +1 | 316 | 45 |

Figure 3B

MAGNET RING WITH JITTERED POLES

CROSS REFERENCE TO RELATED APPLICATION

The present application claims priority to U.S. Provisional Patent Application Ser. No. 62/753,446 filed on Oct. 31, 2018 and entitled "Magnet Ring with Jittered Poles," which is herein incorporated by reference as if fully set forth in this description.

BACKGROUND

Rotary joint devices are often used for transmission of power and/or electrical signals between one structure and another structure in an electromechanical system that operates by causing a relative rotation between the two structures (e.g., stator and rotor). Example systems that employ rotary joint devices include remote sensing systems (e.g., RADARs, LIDARs, etc.) and robotic systems (e.g., for directing microphones, speakers, robotic components, etc.), among others.

SUMMARY

In an example embodiment, a rotational joint is provided that includes a magnet ring with jittered poles. The boundaries between neighboring poles of the magnet ring are jittered relative to a corresponding nominal boundary. Nominal boundaries are defined by an even spacing of the boundaries around the magnet ring. In other words, the poles that make up the magnet ring have different sizes, resulting in a non-uniform distribution of boundaries around the magnet ring. This non-uniform distribution defines a characteristic shift pattern that may be measured by magnetic field sensors to determine a rotational position of the magnet ring. Specifically, a measured magnetic field pattern may be correlated with the characteristic field pattern to determine the relative offset therebetween, which may in turn be used to determine the rotational position of the magnet ring.

In a first example embodiment, an apparatus is provided for determining a rotational position by correlating a characteristic shift pattern to a measured magnetic field pattern. The apparatus includes a first platform having a first side and a second platform having a second side that at least partially overlaps with the first side of the first platform. The second platform is configured to rotate relative to the first platform about an axis. The apparatus also includes a magnet ring mounted to the first side of the first platform and centered around the axis. The magnet ring includes four or more magnetized poles. The four or more magnetized poles are positioned such that each respective boundary between neighboring poles of the four or more poles is shifted relative to a corresponding nominal boundary defined by a uniform spacing of boundaries of the four or more poles around the magnet ring. The shifted boundaries of the four or more poles define a characteristic shift pattern for the magnet ring. The apparatus additionally includes a magnetic field sensor connected to the second side of the second platform and configured to generate the measured magnetic field pattern by measuring characteristics of a magnetic field generated by the four or more poles. The apparatus may further include circuitry configured to determine the measured magnetic field pattern based on data generated by the magnetic field sensor while the second platform rotates relative to the first platform. The circuitry may also be configured to determine the rotational position of the first platform relative to the second platform by correlating the magnetic field pattern to the characteristic shift pattern.

In a second example embodiments, a method is provided that includes generating a first magnetic field that interacts with a second magnetic field generated by four or more poles of a magnet ring. The magnet ring is mounted to a first platform such that the first platform rotates about an axis of rotation relative to a second platform. The method also includes receiving, from a magnetic field sensor connected to the second platform, data indicative of characteristics of the second magnetic field. Each respective boundary between neighboring poles of the four or more poles is shifted relative to a corresponding nominal boundary defined by a uniform spacing of boundaries of the four or more poles around the magnet ring. The method additionally includes determining a magnetic field pattern based on the data received from the magnetic field sensor. The method further includes determining a rotational position of the first platform relative to the second platform by correlating the magnetic field pattern to a characteristic shift pattern for the magnet ring. The characteristic shift pattern is defined by the shifted boundaries of the four or more poles of the magnet ring.

In a third example embodiment, non-transitory computer-readable storage medium is provided having stored thereon instructions that, when executed by a computing device, cause the computing device to perform operations. The operation include providing instructions to generate a first magnetic field by causing an electrical current to flow through an electrically conductive path. The first magnetic field interacts with a second magnetic field generated by four or more poles of a magnet ring mounted to a first platform such that the first platform rotates about an axis of rotation relative to a second platform. The electrically conductive path is included in the second platform. The operations also include receiving, from a magnetic field sensor connected to the second platform, data indicative of characteristics of the second magnetic field. Each respective boundary between neighboring poles of the four or more poles is shifted relative to a corresponding nominal boundary defined by a uniform spacing of boundaries of the four or more poles around the magnet ring. The operations additionally involve determining a magnetic field pattern based on the data received from the magnetic field sensor. The operations further involve determining a rotational position of the first platform relative to the second platform by correlating the magnetic field pattern to a characteristic shift pattern for the magnet ring. The characteristic shift pattern is defined by the shifted boundaries of the four or more poles of the magnet ring.

In a fourth example embodiment, a system includes means for generating a first magnetic field that interacts with a second magnetic field generated by four or more poles of a magnet ring. The magnet ring is mounted to a first platform such that the first platform rotates about an axis of rotation relative to a second platform. Generating the first magnetic field may involve causing an electrical current to flow through an electrically conductive path included in the second platform. The system also includes means for receiving, from a magnetic field sensor connected to the second platform, data indicative of characteristics of the second magnetic field. Each respective boundary between neighboring poles of the four or more poles is shifted relative to a corresponding nominal boundary defined by a uniform spacing of boundaries of the four or more poles around the magnet ring. The system additionally includes means for determining a magnetic field pattern based on the data received from the magnetic field sensor. The system further includes means for determining a rotational position of the first platform relative to the second platform by correlating the magnetic field pattern to a characteristic shift pattern for the magnet ring. The characteristic shift pattern is defined by the shifted boundaries of the four or more poles of the magnet ring.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 3B illustrates pole sizing for a magnetic ring, in accordance with example embodiments.

DETAILED DESCRIPTION

Figure 1:
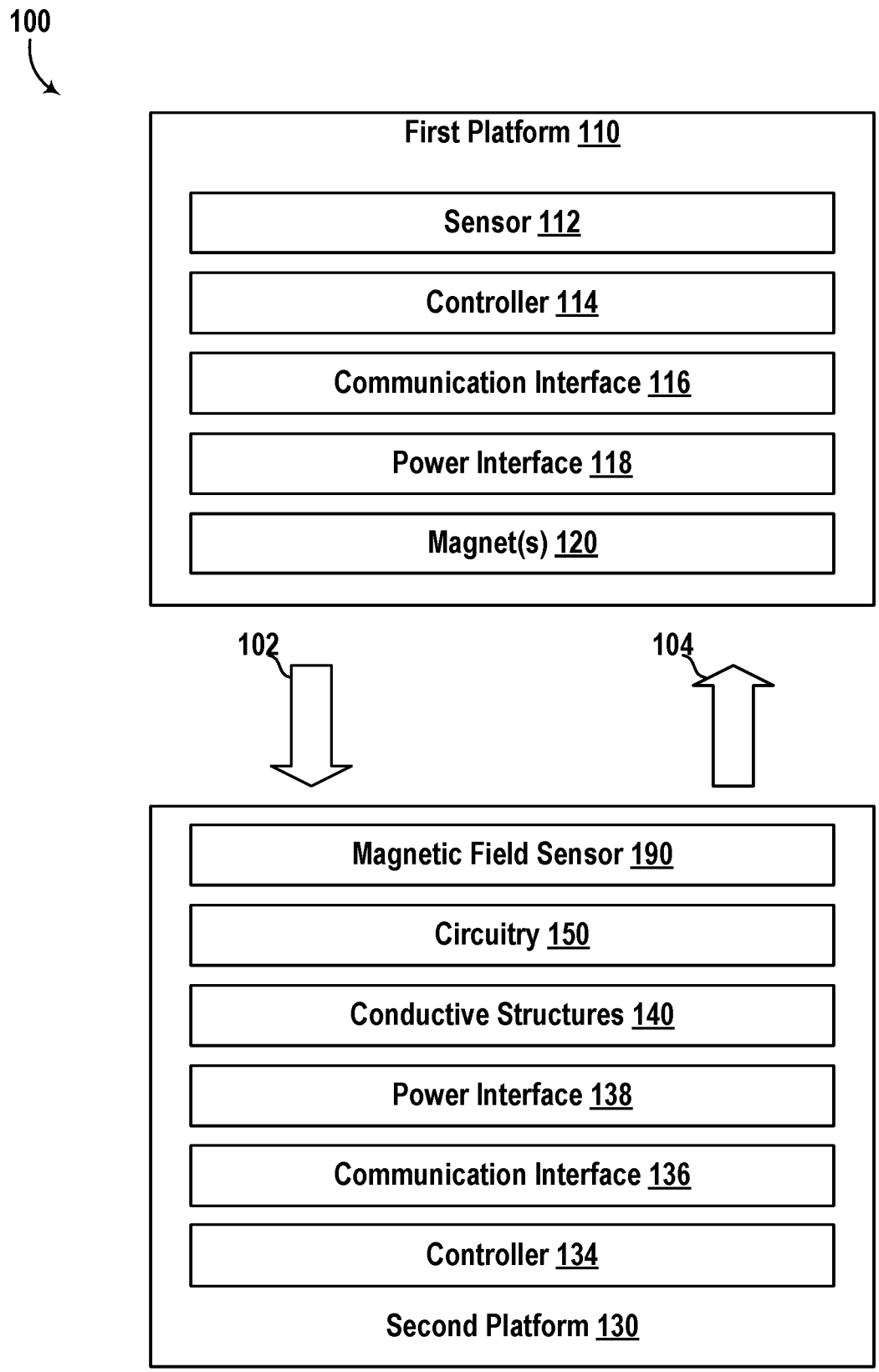
FIG. 1 is a simplified block diagram of a device that includes a rotary joint, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

Many automotive, robotic, and industrial devices include components that rotate with respect to one another. Such components may be included on or may themselves form two platforms that are rotationally coupled to each other. An example rotary joint device includes two platforms arranged such that a first side of a first platform remains within a predetermined distance to a second side of a second platform in response to a relative rotation between the two platforms. In one example, the two platforms may include circularly shaped disks arranged concentrically about a common axis of the respective disks to maintain an overlap between the two platforms in response to rotation of any of the two platforms about the common axis.

In some cases, the angular position of the first platform relative to the second platform may be of interest. For example, the angular position, when tracked over time, may be used to determine and track a relative displacement between the first and second platforms. In another example, this angular position may be used to control an appendage of a robotic device, to steer a sensor on an automobile, or otherwise position the rotary joint. Within example embodiments, a magnet ring with jittered poles may be mounted to the first platform. The jitter of the poles may be measured by one or more magnetic field sensors mounted to the second platform and used to determine an angular position of one platform with respect to the other.

The magnet ring may be mounted about an axis of rotation of the two platforms. The magnet ring may include four or more poles, each magnetized in alternating and opposite directions (e.g., North-South-North-South), and pointing toward the second platform. In one example, the magnet ring can be implemented as a plurality of permanent magnets (e.g., ferromagnets, etc.) that are arranged along a periphery of a circularly shaped disk (e.g., along the first side of the first platform) that is facing the second side of the second platform. In this arrangement, adjacent magnets may have opposite polarity surfaces facing the second platform, and thus, magnetic fields may extend between the adjacent magnets. In another example, the magnet ring can be implemented as a printed ring magnet (e.g., ring structure having magnetized portions) with alternating polarities extending, respectively, over similar areas of the magnet ring. For example, the ring magnet may be a single-part sintered ring magnet. In a further example, the magnet ring can be implemented as a plurality of electromagnets that are arranged along the periphery of the circularly shaped disk that is facing the second side of the second platform.

Adjacent electromagnets in the ring may be driven with currents having opposite directions, thereby creating alternating magnetic polarities extending, respectively, over similar areas of the magnet ring.

The boundary between each two neighboring poles may be jittered (e.g., shifted) relative to a corresponding nominal boundary for these two neighboring poles. The nominal boundary may be a reference point defined by a uniform spacing of pole boundaries about the circumference of the magnet ring. Thus, jittered poles may be formed by the four or more magnetic poles having different sizes, resulting in the boundaries therebetween being shifted relative to where the boundaries would be if each of the poles was of the same size.

The size of the jitter or shift may be selected to be larger than an expected drift due to aging or stress of the magnet ring. When the magnet ring is used as part of a motor (e.g., forming a rotor thereof), the size of the jitter for each pole may be less than a maximum threshold value. Since the motor may expect a rotationally symmetric distribution of magnetic poles, the maximum threshold value may be small enough so as to not significantly affect performance of the motor. For example, the maximum threshold value may be small enough so as to not cause motor vibrations (e.g., beyond a certain amplitude) or reduce motor torque due to the magnetic poles and coils of the motor not having a desired phase relation around the periphery of the magnet ring due to rotational asymmetry introduced by the jitter. Notably, in such a case, the device may combine the functionality of an electric motor and a magnetic encoder while using the same magnet ring.

The shifted pole boundaries may define a characteristic shift pattern for the magnet ring. This characteristic shift pattern may be known to a control system or circuitry used in association with the magnet ring and may be used as a reference in determining the rotational position of the magnet ring. Namely, one or more magnetic field sensors may be used to measure a magnetic field pattern of the magnet ring during rotation thereof. This measured magnetic field pattern, or aspects thereof, may be correlated (e.g., cross-correlated) with the characteristic shift pattern to determine an offset therebetween. The offset between the measured pattern and the characteristic pattern may indicate the relative position of the magnet ring relative to the sensor at different points during the measured pattern. That is, the offset may identify which of the poles are associated with the measured magnetic field pattern based on the characteristic shift pattern.

The correlation may involve computing a sliding dot product (e.g., a cross-correlation) between the measured magnetic field pattern and the characteristic shift pattern. When the measured magnetic field pattern and the characteristic shift pattern are aligned so as to correctly indicate the position of the magnet ring, the value of the dot product therebetween may be higher than any other computed value of the sliding dot product. In the presence of noise, however, the difference between the highest value and other computed values of the sliding dot product may be decreased. In some cases, this may lead to a false positive match that incorrectly indicates the position of the magnet ring.

Accordingly, the characteristic shift pattern may be selected to have an autocorrelation that has a large difference between (i) a highest value of the autocorrelation and (i) any other value of the autocorrelation. That is, the autocorrelation of the characteristic shift pattern may be prominently peaked, having a high value when the characteristic shift pattern is aligned with itself and having significantly lower values when the characteristic shift pattern is not aligned with itself. Accordingly, this characteristic shift pattern may be able to accurately indicate when a measured magnetic field (representing a delayed version of the characteristic shift pattern with noise superimposed thereon) is highly correlated therewith.

When computing the correlation of the measured magnetic field pattern and the characteristic shift pattern, the direction of each transition across a pole boundary may be taken into account. That is, the circuitry or control system may determine whether a particular transition within the measured magnetic field pattern is a North-to-South transition (e.g., a falling transition) or a South-to-North transition (e.g., a rising transition). The characteristic shift pattern may similarly reflect the direction of each transition. Accordingly, computation of the correlation may be simplified by comparing rising and falling transitions within the measured magnetic field pattern to rising and falling transitions, respectively, in the characteristic pattern. In other words, falling transitions within the measured magnetic field pattern might not be compared to rising transitions in the characteristic pattern, and vice versa.

In some implementations, the position of the magnet ring may be monitored by a plurality of magnetic field sensors. When only one magnetic field sensor is used, the magnet ring may need to complete a first portion of a full rotation or a full rotation before its position may be determined. On the other hand, with multiple sensors, the magnet ring may only need to be rotated by a second, smaller portion of this full rotation before its position may be determined, thus allowing a complete pattern of transitions to be observed sooner. Additionally, multiple magnetic field sensors may provide a higher resolution in the position of the magnet ring, reduce the extent of interpolation used in determining this position, and provide additional streams of data that can be averaged to mitigate the effects of noise picked up by the magnetic field sensors.

To that end, a particular distribution of multiple magnetic field sensors about the magnet ring may be expected to result in a particular composite characteristic pattern that is formed based on a combination of the signals from each of these sensors. These sensors may be used to monitor the magnet ring during rotation and may each detect a respective magnetic field pattern. The detected magnetic field patterns may be combined into a composite magnetic field pattern that may then be correlated with the composite characteristic shift pattern to determine the position of the magnet ring.

In one example, the magnetic field sensors may be disposed about the magnet ring in an asymmetric arrangement. As a result, the generated composite magnetic field pattern may be aperiodic (i.e., might not include repeating patterns within one period thereof). Accordingly, the source of each respective magnetic field pattern may be ignored when generating the composite magnetic field pattern. That is, the correlation might not consider which sensor generated a particular rising or falling edge. On the other hand, when the sensors are arranged about the magnet ring symmetrically, the composite magnetic field pattern may be periodic (i.e., may include repeating patterns within one period thereof). Thus, the source sensor for each rising or falling edge may be tracked, allowing the correlation to disambiguate the different repeated patterns within the composite magnetic field pattern from one another.

II. EXAMPLE ROTARY JOINTS

FIG. 1 is a simplified block diagram of a device 100 that includes a rotary joint. As shown, device 100 includes a first platform 110 and a second platform 130. First platform 110 may comprise or may be coupled to a rotor or other moveable component. For example, platform 110 can be configured to rotate relative to platform 130 and about an axis of rotation of platform 110 (e.g., rotor axis). Thus, platform 110 can be configured as a rotating platform in a rotary joint configuration. As shown, platform 110 includes sensor 112, controller 114, communication interface 116, power interface 118, and one or more magnets 120.

In some examples, platform 110 may comprise any solid material suitable for supporting and/or mounting the various components of platform 110. For instance, platform 110 may include a printed circuit board (PCB) that mounts communication interface 116 and/or other components of platform 110. The PCB in this instance can also include circuitry (not shown) to electrically couple one or more of the components of platform 110 (e.g., sensor 112, controller 114, communication interface 116, power interface 118, etc.) to one another. The PCB in this instance can be positioned such that the mounted components are along a side of platform 110 facing or opposite to a corresponding side of platform 130. With this arrangement, for instance, platforms 110 and 130 may remain within a given distance to one another in response to a rotation of platform 110 relative to platform 130.

Sensor 112 may include any combination of sensors mounted to platform 110. A non-exhaustive list of example sensors may include direction sensors (e.g., gyroscopes, accelerometers, etc.), remote sensing devices (e.g., RADARs, LIDARs, etc.), sound sensors (e.g., microphones), among other examples.

Controller 114 may be configured to operate one or more of the components of first platform 110. To that end, controller 114 may include any combination of general-purpose processors, special-purpose-processors, data storage, logic circuitry, and/or any other circuitry configured to operate one or more components of device 100. In one implementation, controller 114 includes one or more processors that execute instructions stored in data storage to operate sensor 112, interface 116, etc. In another implementation, controller 114 alternatively or additionally includes circuitry wired to perform one or more of the functions and processes described herein for operating one or more components of device 100. In one example, controller 114 can be configured to receive sensor data collected by sensor 112, and to provide a modulated electrical signal indicative of the sensor data to communication interface 116. For instance, the sensor data may indicate a measured orientation, a scan of a surrounding environment, detected sounds, and/or any other sensor output of sensor 112.

Communication interface 116 may include any combination of wireless or wired communication components (e.g., transmitters, receivers, antennas, light sources, light detectors, etc.) configured to transmit and/or receive data and/or instructions between platforms 110 and 130. In one example, where communication interface 116 is an optical communication interface, interface 116 may include one or more light sources arranged to emit modulated light signal 102 for receipt by a light detector included in platform 130. For instance, signal 102 may indicate sensor data collected by sensor 112. Further, in this example, interface 116 may include a light detector for receiving modulated light signal 104 emitted from platform 130. For instance, signal 104 may indicate instructions for operating sensor 112 and/or any other component coupled to platform 110. In this instance, controller 114 can operate sensor 112 based on the received instructions detected via interface 116.

Power interface 118 may include one or more components configured for wireless (or wired) transmission of power between platforms 110 and 130. By way of example, interface 118 may include transformer coil(s) (not shown) arranged to receive a magnetic flux extending through the transformer coils to induce an electrical current for powering one or more components (e.g., sensor 112, controller 114, communication interface 116, etc.) of platform 110. For instance, the transformer coils can be arranged around a center region of platform 110 opposite to corresponding transformer coils included in platform 130. Further, for instance, device 100 may also include a magnetic core (not shown) extending through the transformer coils in interface 118 (and/or transformer coils included in platform 130) to guide the magnetic flux through the respective transformer coils thereby improving efficiency of power transmission between the two platforms. Other configurations are possible as well.

Magnet(s) 120 may can be formed from a ferromagnetic material such as iron, ferromagnetic compounds, ferrites, etc., and/or any other material that is magnetized to generate a first-platform magnetic field of platform 110. For example, magnet(s) 120 may be Neodymium-Iron-Boron (NdFeB) magnets. In another example, magnet(s) 120 might not include iron in the composition thereof and might thus be, for example, Aluminum-Nickel-Cobalt (AlNiCo) magnets, among other possibilities.

In one implementation, magnets 120 can be implemented as a plurality of magnets in a substantially circular arrangement around an axis of rotation of platform 110. For example, magnets 120 can be arranged along a circle that is concentric to the axis of rotation to generate a combined magnetic field extending toward and/or through platform 130. Further, for instance, adjacent magnets of magnets 120 can be magnetized in alternating directions such that a magnetic pole of a given magnet along a surface of the given magnet that is facing platform 130 is opposite to a magnetic pole of an adjacent magnet along a similar surface. With this arrangement for instance, a magnetic field may extend from the surface of the given magnet toward platform 130 and then toward the surface of the adjacent magnet. Further, another magnetic field may extend from a surface of the given magnet toward platform 130 and then toward another adjacent magnet.

In another implementation, magnet 120 can be implemented as a single ring magnet that is concentric to the axis of rotation of the first platform. In this implementation, the ring magnet can be magnetized to have a magnetization pattern similar to that of the plurality of magnets described above. For example, the ring magnet can be implemented as a printed magnet having a plurality of ring sectors (e.g., regions of the ring magnet between respective radial axes thereof). In this example, adjacent ring sectors of the ring magnet can be magnetized in alternating directions to define a plurality of alternating magnetic poles facing platform 130.

In a further implementation, magnet 120 can be implemented as a plurality of electromagnets in a substantially circular arrangement around the axis of rotation of platform 110. In this implementation, the electromagnets can be magnetized (e.g., driven with a current having a particular direction) to have a magnetization pattern similar to that of the plurality of magnets described above. For example, adjacent electromagnets in the substantially circular arrangement can be magnetized in alternating directions to define a plurality of alternating magnetic poles facing platform 130.

Second platform 130 can be configured as a stator platform in a rotary joint configuration. For instance, the axis of rotation of platform 110 can extend through platform 130 such that platform 110 rotates relative to platform 130 while remaining within a given distance to platform 130. As shown, platform 130 includes controller 134, communication interface 136, power interface 138, conductive structures 140, circuitry 150, and a magnetic field sensor 190. To that end, platform 130 can be formed from any combination of solid materials suitable for supporting the various components mounted or otherwise coupled to platform 130. In some examples, platform 130 may comprise a circuit board that mounts one or more components (e.g., interfaces 136, 138, sensor 190, etc.) of device 100.

Controller 134 can have various physical implementations (e.g., processors, logic circuitry, analog circuitry, data storage, etc.) similarly to controller 114, for example. Further, controller 134 can operate communication interface 136 to transmit signal 104 indicating a transmission of data or instructions similarly to, respectively, controller 114, communication interface 116, and signal 102, for example. For instance, controller 134 can operate interface 136 (e.g., transceiver, antenna, light sources, etc.) to provide a modulated wireless signal indicating instructions for operating sensor 112 and/or any other component of platform 110. Further, for instance, controller 134 can receive a modulated electrical signal from interface 136 indicating modulated signal 102 transmitted from platform 110.

Communication interface 136 can be implemented similarly to interface 116 to facilitate communication between platforms 110 and 130 via signals 102 and 104.

Power interface 138 can be configured similarly to power interface 118, and may thus be operated in conjunction with power interface 118 to facilitate transmission of power between platforms 110 and 130. By way of example, interface 138 may comprise a transformer coil (not shown), and controller 134 can be configured to cause an electrical current to flow through the transformer coil. The electrical current may then generate a magnetic flux that extends through a corresponding transformer coil (not shown) of power interface 118 to induce an electrical current through the corresponding transformer coil. The induced electrical current could thus provide power for one or more components of platform 110.

Conductive structures 140 may comprise portions of electrically conductive material (e.g., copper, other metal, etc.) that are electrically coupled together to define an electrically conductive path that extends around the axis of rotation of platform 110 to overlap the first-platform magnetic field generated by magnet(s) 120. By way of example, conductive structures 140 may include a first plurality of conductive structures in a first coplanar arrangement along a circle that is concentric to the axis of rotation of platform 110. Further, in this example, conductive structures 140 may also include a second plurality of conductive structures in a second coplanar arrangement to overlap parallel to the first plurality of conductive structures. For instance, in a circuit board implementation, the first plurality of conductive structures can be disposed or patterned along a single layer of the circuit board, and the second plurality of conductive structures can be disposed or patterned along another layer of the circuit board.

Continuing with the example above, device 100 could also include a plurality of electrical contacts (not shown), such as conductive material that extends through a drilled hole between two layers of a circuit board (e.g., via) for instance. The electrical contacts may couple the first plurality of conductive structures to the second plurality of conductive structures to define one or more conductive coils extending around the axis of rotation to overlap the circular arrangement of magnet(s) 120 of the first platform. Circuitry 150 (and/or controller 134) can then cause one or more electrical currents to flow through the one or more coils to generate a second-platform magnetic field extending within the one or more coils. The first-platform magnetic field could then interact with the second-platform magnetic field to provide a force or torque acting on platform 110. The induced force may then cause platform 110 to rotate about the axis of rotation thereof. Further, in some instances, circuitry 150 (and/or controller 134) can modulate the second-platform magnetic field by adjusting the electrical current(s) flowing through the coil(s). By doing so, for instance, device 100 can control a direction or rate of rotation of platform 110 about the axis of rotation.

Accordingly, circuitry 150 may include any combination of wiring, conductive material, capacitors, resistors, amplifiers, filters, comparators, voltage regulators, controllers, and/or any other circuitry arranged to provide and modulate electrical current(s) flowing through conductive structures 140. For instance, circuitry 150 may be configured to condition the electrical current(s) to modify the second-platform magnetic field and thereby achieve certain rotation characteristics (e.g., direction, speed, etc.) for rotating platform 110.

Magnetic field sensor 190 may be configured to measure one or more characteristics (e.g., direction, angle, magnitude, flux density, etc.) of the first-platform magnetic field associated with magnet(s) 120. For example, sensor 190 may include one or more magnetometers arranged to overlap magnet(s) 120 and/or the first-platform magnetic field. A non-exhaustive list of example sensors includes proton magnetometers, Overhauser effect sensors, cesium vapor sensors, potassium vapor sensors, rotating coil sensors, Hall effect sensors, magneto-resistive device sensors, fluxgate magnetometers, superconducting quantum interference device (SQUID) sensors, micro-electro-mechanical-system (MEMS) sensors, and spin-exchange relaxation-free (SERF) atomic sensors, among other examples. In one implementation, sensor 190 may comprise a three-dimensional (3D) Hall effect sensor that outputs an indication of an angle (and/or magnitude) of the first-platform magnetic field at a position of sensor 190 according to an orthogonal coordinate system representation (e.g., x-y-z axis components) or other vector field representation.

Thus, device 100 could use output(s) from sensor 190 as a basis for determining an orientation or position of platform 110 about the axis of rotation. By way of example, sensor 190 can be positioned to overlap a portion of the first-platform magnetic field extending between two adjacent magnets of magnet(s) 120. As first platform 110 rotates, the angle of the portion may change at the position of sensor 190 and thus circuitry 150 (and/or controller 134) can sample outputs from sensor 190 to deduce the position of sensor 190 relative to the two adjacent magnets.

Thus, with this arrangement, device 100 could use magnet(s) 120 as component(s) for both actuating platform 110 and measuring the orientation of platform 110 (e.g., magnetic encoder). This arrangement can provide an actuator and a magnetic encoder with reduced costs and with a more compact design.

In some implementations, device 100 may include fewer or more components than those shown. In one example, device 100 can be implemented without sensor 190, and/or any other component shown. In another example, platforms 110 and/or 130 may include additional or alternative sensors (e.g., microphone, etc.), computing subsystems, and/or any other component. Additionally, it is noted that the various functional blocks shown can be arranged or combined in different arrangements than those shown. For example, some of the components included in platform 110 can be alternatively included in platform 130 or implemented as separate components of device 100.

Figure 2:
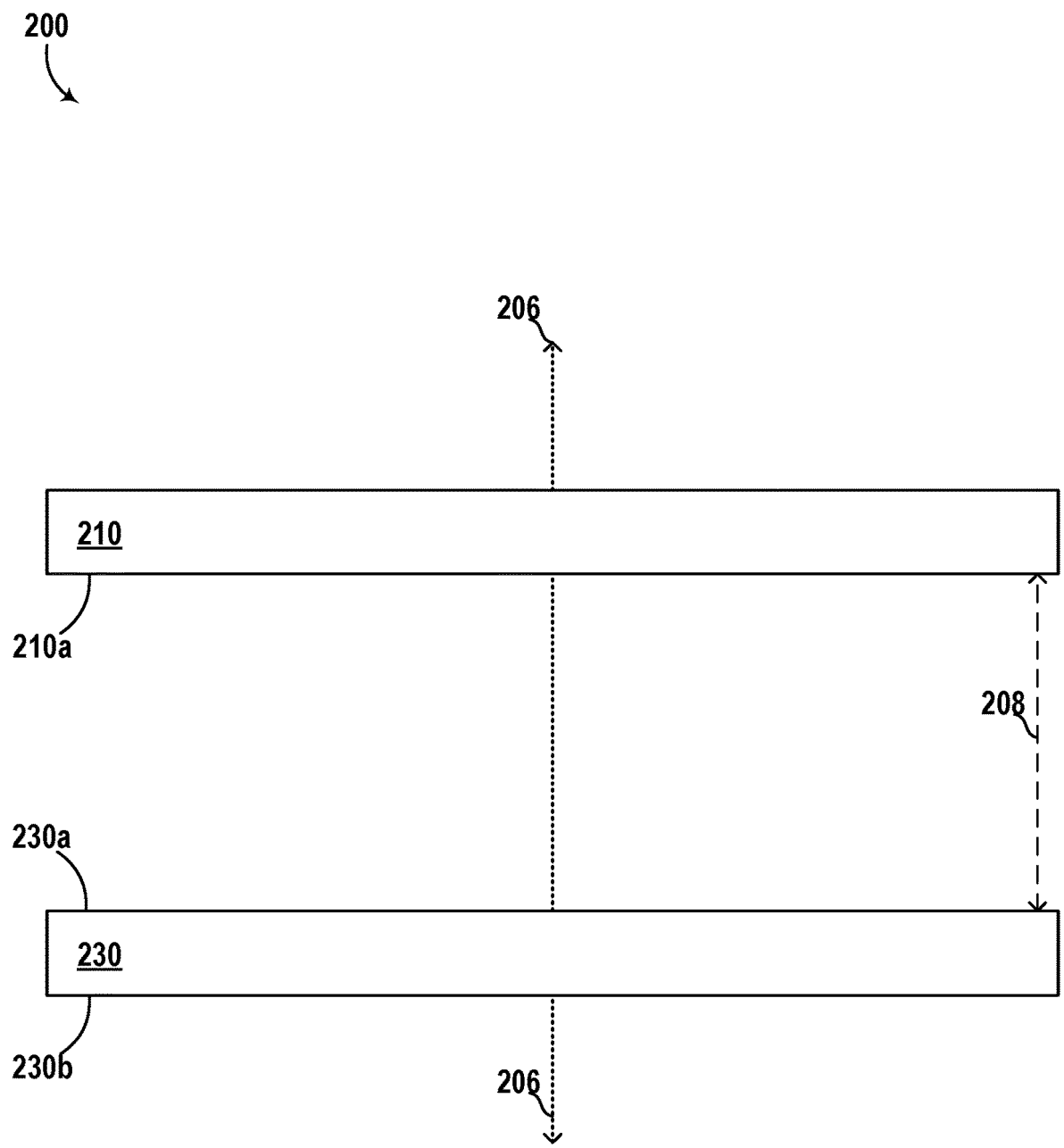
FIG. 2 illustrates a side view of a device that includes a rotary joint, in accordance with example embodiments.

FIG. 2 illustrates a side view of device 200 that includes a rotary joint. As shown, device 200 includes a rotor platform 210 and a stator platform 230 that may be similar, respectively, to platforms 110 and 130. In the example shown, a side 210a of platform 210 is positioned at a given distance 208 to a side 230a of platform 230. Platform 210 can be configured as a rotor platform that rotates about axis of rotation 206. Further, platform 230 can be configured as a stator platform that remains within distance 208 to platform 210 in response to rotation of platform 210 about axis 206. In some examples, side 210a may correspond to a planar mounting surface of platform 210 (e.g., an outer layer of a circuit board). Similarly, for example, side 230a may correspond to a planar mounting surface of platform 230.

III. EXAMPLE MAGNET RING WITH JITTERED POLES

Figure 3A:
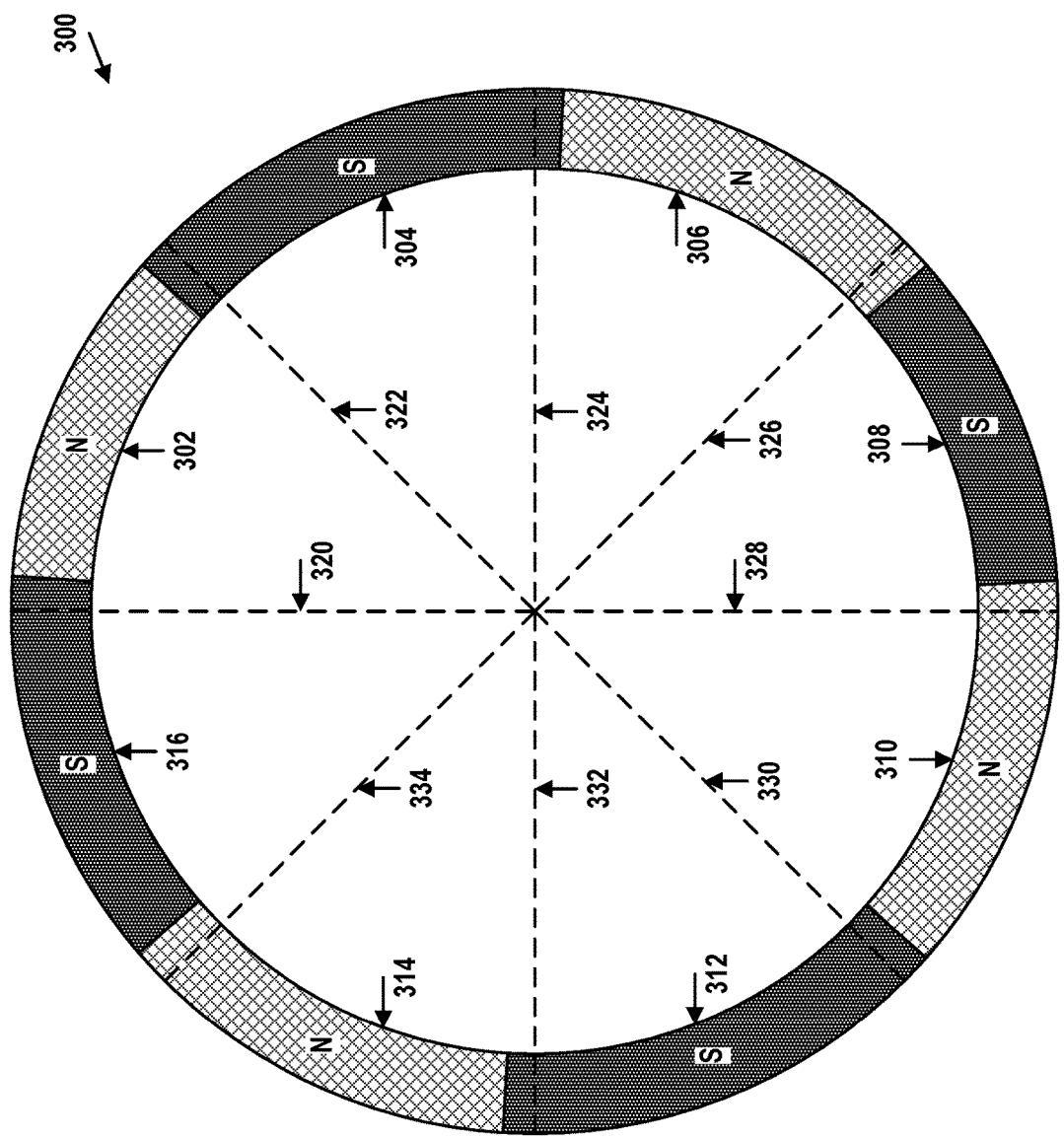
FIG. 3A illustrates a magnet ring, in accordance with example embodiments.

FIG. 3A illustrates magnet ring 300 that has jittered poles. Specifically, FIG. 3A illustrates a top-down view of magnet ring 300 which may, for example, be disposed on side 230a of platform 230. Magnet ring 300 may alternatively be referred to as a ring magnet, magnetic ring, or simply a ring. In this example, magnet ring 300 includes eight magnetic poles 302, 304, 306, 308, 310, 312, 314, and 316 (i.e., poles 302-316). Poles 302, 306, 310, and 314 are magnetized with their respective north poles ("N") facing out of the page (i.e., pointing up from platform 230 towards platform 210). On the other hand, poles 304, 308, 312, and 316 are magnetized with their respective south poles ("S") facing out of the page (i.e., pointing down from platform 230). Although magnet ring 300 includes eight magnetic poles in this example, it is to be understood that the number of magnetic poles may range from four poles to a few hundred or thousand poles, depending, for example, on the size of magnet ring 300. Poles 302-316 may be defined by discrete magnets, by ring sectors of a ring magnet, or by electromagnets.

The boundary between neighboring poles (e.g., pole 302 and pole 304) of poles 302-316 is jittered. That is, the boundary is shifted relative to where the boundary would be if each of the poles were of equal size. Stated another way, each of poles 302-316 has a slightly different size, resulting in uneven spacing of (i.e., an asymmetric distribution of) pole boundaries around magnet ring 300.

In FIG. 3A, lines 320, 322, 324, 326, 328, 330, 332, and 334 (i.e., lines 320-334) illustrate where the pole boundaries would fall if each of poles 302-316 was of equal size. That is, lines 320-334 illustrate an even spacing of (i.e., a symmetric distribution of) pole boundaries along magnet ring 300. The boundaries defined by lines 320 to 334 may be referred to as nominal boundaries. In magnet ring 300, however, each of the actual boundaries between neighboring poles in poles 302-316 is shifted by a respective amount relative to the corresponding nominal boundary in nominal boundaries 320-334, thereby defining a characteristic shift pattern of pole boundaries. For example, pole 304 starts before line 322 and ends after line 324, whereas without such jitter pole 304 would start at line 322 and end at line 324.

The pattern of the respective shifts in the transitions or boundaries between poles 302-316 may be used to determine a rotational position of magnet ring 300 relative to another structure rotating relative thereto. Specifically, during operation, the transitions between adjacent poles may be measured by a magnetic field sensor. The measured transitions may then be compared to the known pattern of transitions for magnet ring 300 to identify the rotational position thereof, as described in more detail below. For example, the position of platform 230 (to which magnet ring 300 may be coupled) relative to platform 210 may be determined.

FIG. 3B shows a table that summarizes the distribution of pole boundaries shown in FIG. 3A. Namely, FIG. 3B illustrates columns that indicate the transition (i.e., the boundary) between two adjacent poles, the corresponding nominal transition angle for that boundary, the shift of the actual pole boundary relative to the nominal transition angle, and the resulting pole size. Namely, the first transition from pole 316 to pole 302 has a nominal transition angle of 0 degrees (corresponding to line 320) and is shifted by +1 degrees relative to the nominal transition angle. This results in an actual transition angle of 1 degree and a pole size of 43 degrees for pole 302. The second transition from pole 302 to pole 304 has a nominal transition angle of 45 degrees (corresponding to line 322) and is shifted by −1 degrees relative to the nominal transition angle. This results in an actual transition angle of 44 degrees and a pole size of 47 degrees for pole 304.

Similarly, the third transition from pole 304 to pole 306 has a nominal transition angle of 90 degrees (corresponding to line 324) and is shifted by +1 degrees, resulting in an actual transition angle of 91 degrees and a pole size of 45 degrees for pole 306. The fourth transition from pole 306 to pole 308 has a nominal transition angle of 135 degrees (corresponding to line 326) and is shifted by +1 degrees, resulting in an actual transition angle of 136 degrees and a pole size of 43 degrees for pole 308. The fifth transition from pole 308 to pole 310 has a nominal transition angle of 180 degrees (corresponding to line 328) and is shifted by −1 degrees, resulting in an actual transition angle of 179 degrees and a pole size of 45 degrees for pole 310. The sixth transition from pole 310 to pole 312 has a nominal transition angle of 225 degrees (corresponding to line 330) and is shifted by −1 degrees, resulting in an actual transition angle of 224 degrees and a pole size of 47 degrees for pole 312. The seventh transition from pole 312 to pole 314 has a nominal transition angle of 270 degrees (corresponding to line 332) and is shifted by +1 degrees, resulting in an actual transition angle of 271 degrees and a pole size of 45 degrees for pole 314. Finally, the eighth transition from pole 314 to pole 316 has a nominal transition angle of 315 degrees (corresponding to line 334) and is shifted by +1 degrees, resulting in an actual transition angle of 316 degrees and a pole size of 45 degrees for pole 316.

In some embodiments, the fraction of the total number of pole boundaries that are shifted may be smaller than that shown in FIGS. 3A and 3B. That is, some of the pole boundaries may be shifted while others remain at their respective nominal positions. In one example, one or more of the pole boundaries may be shifted while the remaining pole boundaries remain at their nominal positions. Notably, increasing the number of shifted pole boundaries makes magnet ring 300 more resilient against manufacturing variations in the positioning of pole boundaries and drift of the pole boundaries due to aging or stress on magnet ring 300. Additionally, increasing the number of shifted pole boundaries allows the rotational position of magnet ring 300 to be determined based on a smaller subset of a full rotation thereof than would otherwise be possible with a smaller number of shifted pole boundaries.

In some embodiments, other shift values may be used for each of the transitions. Namely, the transitions may be shifted, or jittered, by more than 1 degree. In implementations that use magnet ring 300 as part of a motor (i.e., where magnet ring 300 is the stator of the motor), the amount of jitter may be determined in part by the desired motor performance. Namely, the motor may operate best when magnet ring 300 does not include any jitter such that poles 302-316 are symmetrically distributed around the ring. For example, controller 134 may drive conductive structures 140 with a current pattern that assumes poles 302-316 to be of equal size and, thus, the boundaries therebetween to be spaced apart uniformly. Large jitter may result in the current pattern not matching the spacing of poles 302-316, resulting in undesirable motor behavior (e.g., vibration, variations in output torque, etc.). Nevertheless, some jitter (e.g., up to 3 degrees) might not appreciably affect performance of the motor but may allow for determination of the position of magnet ring 300.

Notably, the shift values may be selected such that the back-electromagnetic force (i.e., back-emf) pattern generated by the motor is unaffected (e.g., is the same as if no jitter was present in magnet ring 300) by the jitter of the transitions. For example, the shift values may be selected such that, when the back-emf is summed across multiple coils (that form the motor) interacting with multiple corresponding poles of magnet ring 300, the back-emf pattern remains constant across multiple poles. As the number of poles that make up magnet right 300 increases, the effect of the transition jitter on motor performance parameters (e.g., torque, vibration, back-emf, etc.) may decrease.

The amount of jitter included at each boundary may also be based on an expected drift of the boundaries between poles 302-316. Namely, the boundaries may drift from their original positions over the life of magnet ring 300 as magnet ring 300 ages, experiences mechanical perturbations, and/or experiences other conditions that cause such drift. The boundaries may also vary from their intended (jittered) positions due to variations in the manufacturing process of magnet ring 300. Thus, the amount of jitter may be selected to be greater than the maximum expected drift or manufacturing variation in the positions of a boundary. For example, the amount of jitter may be selected to be 10 times greater than the maximum expected drift or manufacturing variation, thus mitigating the effects of noise due to aging and manufacturing variations of magnet ring 300. Alternatively, in another example, the amount of jitter may be selected to be 5 times greater than an average expected drift or manufacturing variation.

Figure 3C:
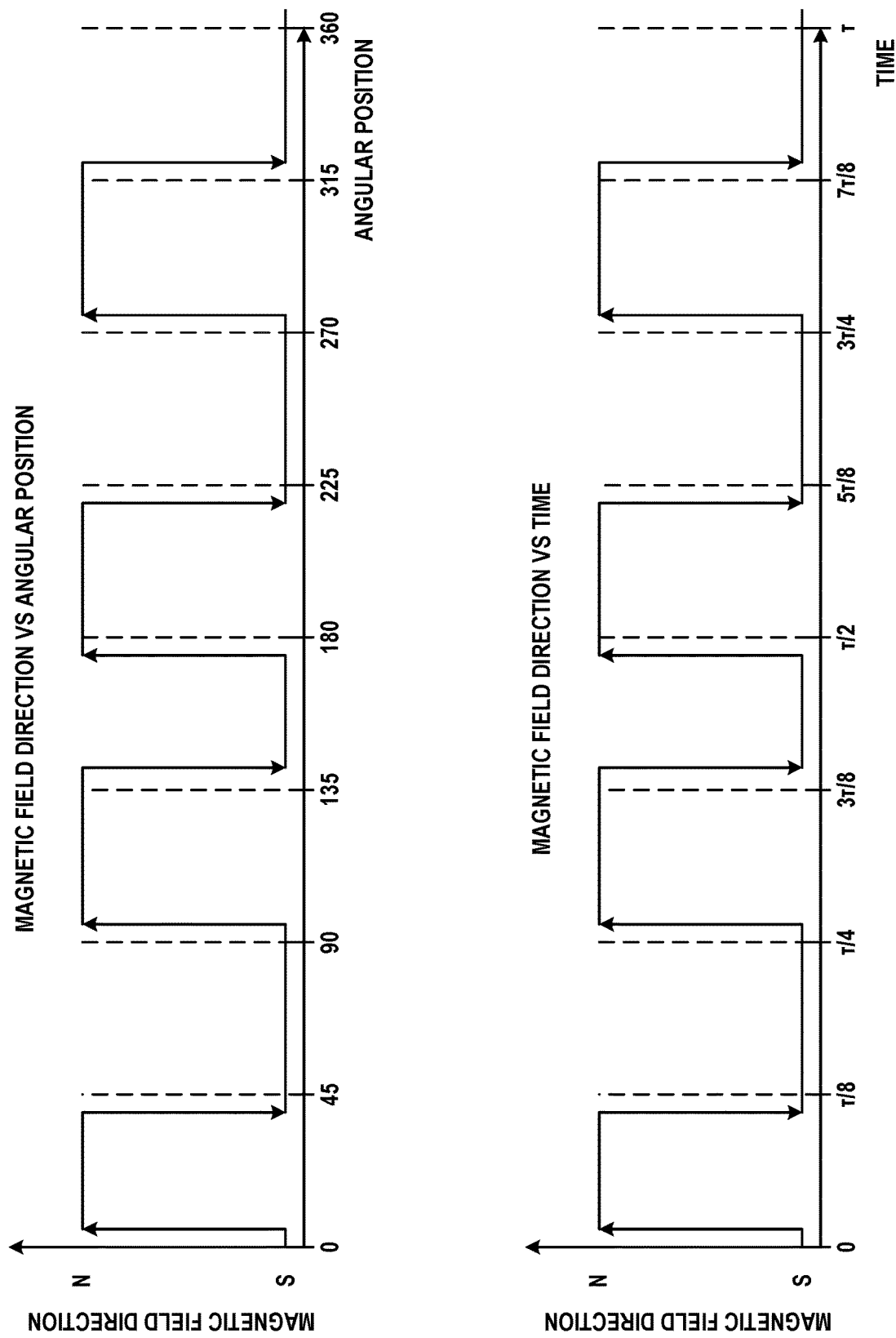
FIG. 3C illustrates graphs of a characteristic shift pattern of a magnet ring, in accordance with example embodiments.

The jittered transitions between adjacent poles may be detected during operation by one or more magnetic field sensors. The detected jitter pattern may be correlated with a known jitter pattern (i.e., the characteristic shift pattern) for magnetic ring 300 and thus used to determine the position of magnet ring 300 relative to the magnetic field sensor and any structure to which this sensor is coupled. To that end, FIG. 3C illustrates the known jitter pattern corresponding to magnet ring 300. Namely, the top and bottom charts in FIG. 3C illustrate the expected response of a magnetic field sensor as a function of angular position of magnet ring 300 and time, respectively.

FIG. 3C illustrates the nominal transition angles with dashed lines and actual transition angles with solid arrowed lines. That is, South to North transitions are shown as arrowed lines pointing up, while the opposite transitions are shown as arrowed lines pointing down. For any two adjacent poles, the difference between the nominal boundary and the actual boundary (i.e., the shift amount) is visually illustrated by the horizontal distance between an arrowed line and its closest dashed line. The time stamps in the bottom chart are expressed as a function of the period of rotation $\tau$ of magnetic ring 300. Accordingly, one period corresponds to 360 degrees, half a period corresponds to 180 degrees, one quarter of a period corresponds to 90 degrees, and so on.

Notably, the charts shown in FIG. 3C illustrate the expected response of the magnetic field sensor when magnet ring 300 rotates at a constant angular velocity. In some cases, when the angular velocity is not constant or substantially constant (i.e., the angular acceleration is less than a threshold value), the characteristic pattern might not be usable to determine the angular position of magnet ring 300. That is, when the angular velocity is not at least substantially constant, any observed shift in the boundary between two poles might be caused by a change in velocity rather than jitter of the poles. However, the observed shifts in the boundaries may nevertheless be averaged together across two or more rotations of magnet ring 300, thus allowing the position of magnet ring 300 to be determined even when the rotational velocity thereof is not substantially constant.

IV. EXAMPLE JITTER PATTERN SELECTION

Determining the rotational position of magnet ring 300 may involve monitoring changes in the magnetic field observed by the magnetic field sensor over a period of time. Specifically, for each rising edge (i.e., South to North transition) and falling edge (i.e., North to South transition) observed by the magnetic field sensor, circuitry or a control system (e.g., controller 114 or 134) associated with a system or device that utilizes magnet ring 300 may be configured to determine a duration of time for which output values indicative of a north pole or a south pole, respectively, are sustained. For example, when the output of the magnetic field sensor is expressed as a square wave, the circuitry may be configured to count the durations of the respective high and low portions of this square wave. These durations may be expressed as t(n) for each of n detected transitions. Alternatively, in some implementations, the time of each rising and falling edge may be determined. The length of time between consecutive rising and/or falling edges may then be determined based on the amount of time between consecutive edges, thereby providing information similar to the measured duration of the high and low values of the square wave.

Since magnetic ring 300 rotates at a constant angular velocity, a corresponding angular distance a(n) may be determined for each of the durations t(n). Namely, a(n)=360°×f×t(n), where f represents the frequency of rotation in Hertz and a(n) represents the angular distance in degrees. This angular distance may, in turn, be used to determine the measured shift pattern b(n) for any detected transition. Namely, b(n)=a(n)−360/k, where k represents the number of poles in magnet ring 300. The measured shift pattern b(n) may be correlated with the characteristic shift pattern of magnetic ring 300, represented as ε(n). Specifically, multiple delayed version of the ε(n) signal may be compared to the b(n) signal. This operation may alternatively be referred to as a cross-correlation, a sliding dot product, or a sliding inner-product between b(n) and ε(n).

By computing $\min_m(\Sigma_{n=0}^{k}(b(n)-\varepsilon(n-m))^2)$ ("Equation 1"), the value of m that produces the smallest difference between the measured shift pattern and the characteristic shift pattern may be determined. This value of m represents the number of poles separating (i) the transition between pole 302 and 304 of FIG. 3A and (ii) the first transition in the measured sequence, thereby indicating the actual angular position of magnetic ring 300 relative to the magnetic field sensor. Notably, norms other than the Euclidian norm may be used in alternative expressions of Equation 1.

The measured shift b(n) represents a delayed version of $\varepsilon(n)$ with noise superimposed thereon. That is, the quantity measured by the magnetic field sensor reflects the expected magnetic field pattern of magnet ring 300 but also includes noise due to real-world operating conditions. The value of m that minimizes Equation 1 above will thus be easiest to identify when (i) the product of $\varepsilon(n)$ with itself has a high value, (ii) the product of $\varepsilon(n)$ with a time-shifted version of itself (e.g., $\varepsilon(n-m)$) has a low value (i.e., much lower than (i)), and (iii) any expected noise is smaller than the difference between (i) and (ii).

In other words, in order to accurately map the measured shift pattern to the characteristic shift pattern of magnet ring 300, thereby making the actual position of magnet ring 300 easy to detect, the characteristic shift pattern $\varepsilon(n)$ should be such that A(0) is maximized and A(2m) is minimized (when m≠0), where $A(m)=\Sigma_{n=0}^{k}\varepsilon(n)\varepsilon(n-m)$ ("Equation 2"). Stated another way, the correlation between b(n) and the time-shifted version of $\varepsilon(n)$ should be highest when the two are aligned such that the measured shift pattern matches the characteristic shift pattern (i.e., the position of magnet ring 300 is correctly detected) and should be low when the two are not aligned.

Notably, minimizing A(2m) assumes that measured rising edges are compared to rising edges, but not falling edges, in the characteristic pattern. That is, the correlation is performed with a step size of two to avoid comparing rising edges to falling edges (which are not expected to produce a positive match). In contrast, when the correlation ignores whether a given edge is rising or falling and instead only compares the measured shift of a transition to the different shifts in the characteristic shift pattern, A(m) should be minimized instead. That is, the correlation is performed with a step size of one, ignoring whether an edge is rising or falling and focusing instead on the degree of similarity between the measured and known shift values.

Accordingly, the characteristic shift pattern $\varepsilon(n)$ (e.g., column 3 of FIG. 3B) may be selected using Equation 2. Specifically, the characteristic shift pattern may be selected such that (i) a maximum value of the autocorrelation of $\varepsilon(n)$ (i.e., the correlation of $\varepsilon(n)$ with itself) exceeds a first threshold and (ii) a second highest value of the autocorrelation of $\varepsilon(n)$ is smaller than a second threshold. Alternatively, the characteristic shift pattern may be selected such that a difference between the maximum value of the autocorrelation of the characteristic shift pattern and the second highest value is greater than a third threshold value. Notably, this third threshold value represents an extent of noise that the system can tolerate while still correctly identifying the position of magnet ring 300.

Notably, the characteristic shift pattern may be selected in a plurality of ways. In one example, a plurality of different shift values may be determined manually and evaluated using Equation 2. For example, the shift value at each boundary may have a maximum value of 2 degrees as dictated by desired motor performance. Combinations may be manually generated until a satisfactory combination is found (e.g., one where the third threshold value is exceeded, as explained above). Alternatively, candidate shift values may be programmatically generated and evaluated by a computing device. A combination of shift values that exceed the third threshold by a highest amount may be selected to be physically implemented in magnet ring 300. Yet another approach may involve finding an optimal value of Equation 2 through numerical simulation, for example. Other approaches may adapt various techniques for generating low autocorrelation binary sequences.

In some implementations, once the measured shift pattern is successfully correlated with the characteristic shift pattern and the rotational position of magnet ring 300 is determined, the frequency of additional correlations might be reduced. For example, when, upon startup of a motor, the absolute position of magnet ring 300 is determined using the correlation process discussed above, the rotational position may continue to be monitored without additional correlations. Instead, the rotational position of magnet ring 300 may be monitored based on the pattern of rising and falling transitions detected by the magnetic field sensor. The correlation process may, however, be repeated at a lower frequency (e.g., every 100 revolutions vs. every 1 revolution) to, for example, validate the position of magnet ring 300.

V. EXAMPLE SENSOR POSITIONING FOR MAGNETIC RING FINGERPRINTING

As discussed above, a single magnetic field sensor may be used to detect a magnetic field pattern of magnet ring 300 as it rotates. This magnetic field pattern may be compared to the characteristic field pattern to determine the rotational position of magnet ring 300. This comparison may involve computing a correlation between the measured magnetic field pattern and the characteristic shift pattern. In one implementation, this computation may be performed with a step size of one, resulting in a comparison of each detected shift value to each known shift value reflected in the characteristic shift pattern, and thus ignoring whether a particular transition is a rising transition or a falling transition.

In another implementation, this computation may be performed with a step size of two, resulting in a comparison between (i) rising transitions in the measured shift pattern to rising transitions in the characteristic shift pattern and (ii) falling transitions in the measured shift pattern to falling transitions in the characteristic shift pattern. Notably, rising transitions might not be compared to falling transitions, and vice versa. Since the respective directions of the magnetic fields generated by the different poles in magnet ring 300 are alternating, a step size of two results in this type of transition-aware comparison.

Accordingly, such transition-aware correlation may take approximately half the time to compute as a correlation that ignores the type of transition. Additionally, transition-aware correlation excludes possible rotational positions that are incorrect (due to the transitions in the measured shift pattern not matching those of the characteristic shift pattern), thus reducing the likelihood of determining an erroneous rotational position. Further, magnet ring 300 might not need to complete as large a portion of a full rotation (as would otherwise need to be completed without a transition-aware comparison) relative to the magnetic field sensor before its position could be determined using transition-aware correlation. Instead, transition-aware correlation might be able to unambiguously determine the position of magnet ring 300 after it completes a subset of this large portion of a full rotation.

Additionally, in some implementations, the system or device that utilizes magnet ring 300 may employ multiple magnetic field sensors in determining the position of magnet ring 300. Notably, the additional magnetic field sensors may be spaced about the circumference of magnet ring 300 and may therefore detect, within a given time window or for a given angular displacement of magnet ring 300, more pole transitions than a single magnetic field sensor.

Figure 4:
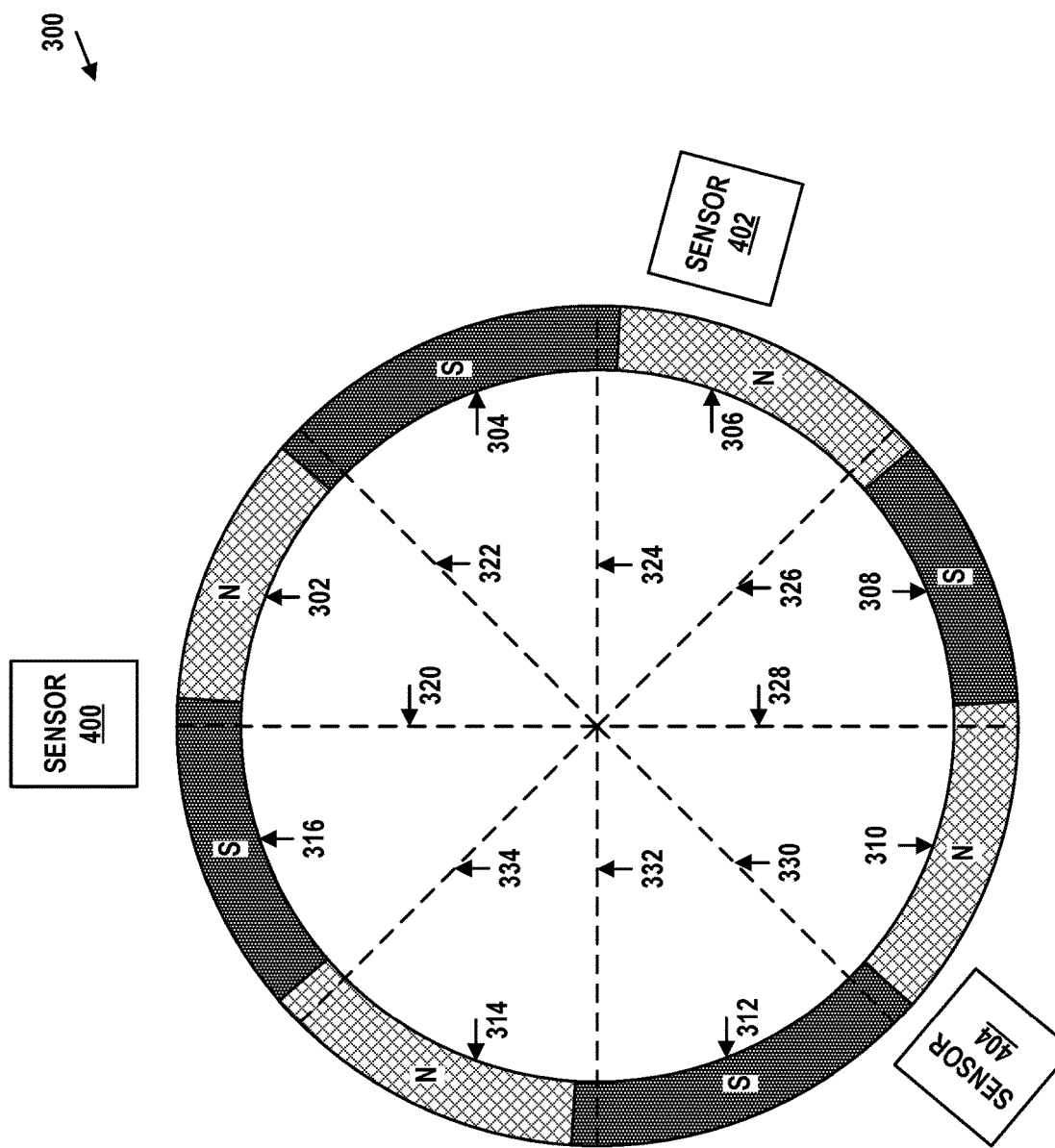
FIG. 4 illustrates a magnet ring and magnetic field sensors, in accordance with example embodiments.

FIG. 4 illustrates an example arrangement of magnetic field sensors 400, 402, and 404 (i.e., sensors 400-404) around magnet ring 300. Sensors 400-404 may be connected to side 210a of platform 210 such that they move relative to magnet ring 300 (connected to side 230a of platform 230) and thus detect changes in the characteristic of the magnetic field across poles 302-316.

In one implementation, sensor 400 may be disposed at 0 degrees, sensor 402 may be disposed at 100 degrees, and sensor 404 may be disposed at 220 degrees. That is, sensor 402 may be separated from sensor 400 by 100 degrees, sensor 404 may be separated from sensor 402 by 120 degrees, and sensor 404 may be separated from sensor 400 by 140 degrees. Thus, by rotating magnetic ring by 140 degrees, sensors 400-404 may collectively detect each of the transitions thereon.

Figure 5:
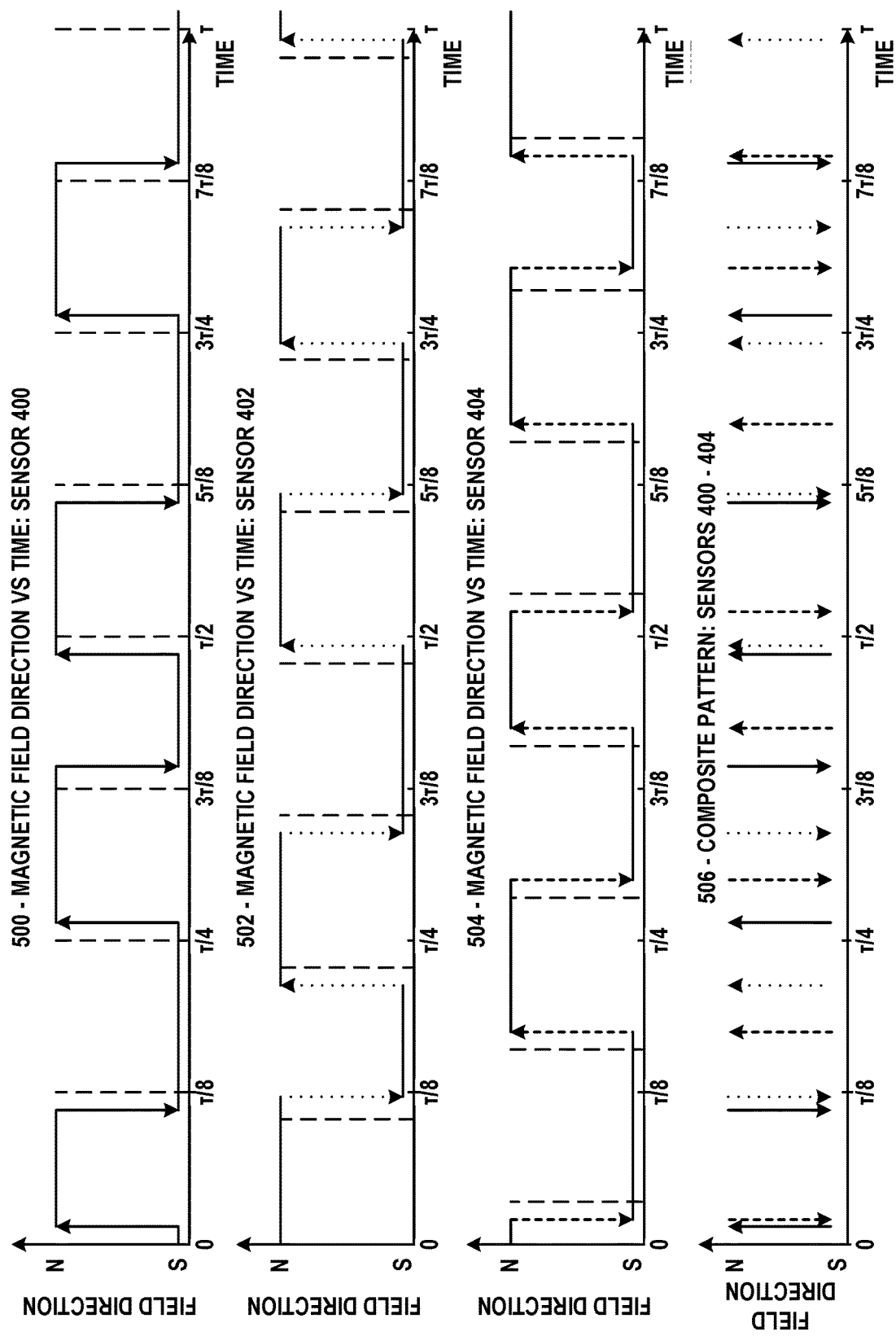
FIG. 5 illustrates a composite characteristic shift pattern, in accordance with example embodiments.

The signals from each of sensors 400-404 may be combined into a single series of rising and falling edges and used to determine the rotational position of magnet ring 300, much like the characteristic shift pattern. FIG. 5 illustrates an example composite pattern made up of the individual patterns corresponding to each of sensors 400-404. Namely, chart 500 illustrates the magnetic field pattern measured over a period of time by sensor 400 when magnetic ring is rotated by 360 degrees from the position shown in FIG. 4. Similarly, chart 502 illustrates the magnetic field pattern measured over the same period of time by sensor 402 when magnetic ring is rotated by 360 degrees from the position shown in FIG. 4. Finally, chart 504 illustrates the magnetic field pattern measured over the same period of time by sensor 404 when magnetic ring is rotated by 360 degrees from the position shown in FIG. 4.

Chart 506 illustrates the composite pattern of rising and falling edges measured over this period of time by all of sensors 400-404 when magnetic ring is rotated by 360 degrees from the position shown in FIG. 4. That is, chart 506 combines the rising and falling edges shown in charts 500-504, showing each with a different corresponding line pattern, to illustrate a composite characteristic pattern generated by sensors 400-404. The composite characteristic pattern of chart 506 is specific to the shift pattern of magnet ring 300 and the positioning of magnetic field sensors 400-404. In other words, changing either the characteristic shift pattern of magnet ring 300 or a position of one or more of sensors 400-404 would produce a different composite characteristic shift pattern.

Notably, when sensors 400-404 are spaced around magnet ring 300 asymmetrically (e.g., not separated by 120 degrees from each other), the composite characteristic pattern in chart 506 is aperiodic. Specifically, the characteristic pattern is aperiodic even when the source of a particular rising or falling edge is ignored (i.e., if all lines are shown with one pattern). As a result, when magnetic field sensors 400-404 are positioned asymmetrically around magnet ring 300, the angular position of magnet ring 300 can be determined without regard to the source of each rising or falling edge. Instead, a composite pattern may be generated by combining all of the signals from sensors 400-404 without tracking the source of each signal. This composite pattern may then be correlated with the known characteristic composite pattern for magnet ring 300 and sensors 400-404 to determine the relative position of magnet ring 300 relative to sensors 400-404.

When both rising and falling edges are tracked by each of sensors 400-404, the correlation may proceed with a step size greater than 2. For example, when each of sensors 400-404 detects one edge, a composite pattern of 3 edges is formed (e.g., Rising-Falling-Falling). This detected composite pattern may be correlated with portions of the known composite pattern having the same sequence of rising and falling edges, but might not be compared to portions having a different sequence of rising and falling edges since no positive match is expected to result from such a comparison.

Magnetic field sensors 400-404 may be spaced around magnet ring 300 so as to generate a desired electrical phase difference between these sensors. For example, sensors 400-404 may be spaced such that the square waves generated thereby are expected to be out of phase by 60 degrees, while sensors 400-404 remain in a mechanically asymmetric arrangement around magnet ring 300. In this implementation, the measured composite pattern may include a repeating pattern of six edges (e.g., Rising-Rising-Rising-Falling-Falling-Falling), with each edge reflecting a measured shift relative to the expected nominal boundary between adjacent poles. This detected composite pattern may thus be correlated with the known composite characteristic pattern using a step size of 6.

In some implementations, sensors 400-404 may be spaced around magnet ring 300 in a symmetric fashion (e.g., separated by 120 degrees from each other). In such cases, the composite characteristic pattern may also be used to determine the position of magnet ring 300 with respect to sensors 400-404. However, the pattern generated by each of sensors 400-404 will be periodically repeated every 120 degrees. For example, when magnet ring 300 is rotated by 120 degrees, sensor 402 will generate a first output pattern. When magnet ring 300 is rotated counterclockwise by another 120 degrees, sensor 400 will generate a second output pattern approximately identical (aside from any noise) to the first output pattern.

If the individual patterns of rising and falling edges generated by sensors 400-404 are combined without regard to the source of each pattern, the resulting composite pattern will have periodic features that repeat 3 times during a single rotation. Thus, in order to determine the rotational position of magnet ring 300 when sensors 400-404 are spaced symmetrically, the source of each signal in the composite pattern may be tracked. Namely, the source of each rising and falling edge may be tracked and taken into account when computing the correlation. Thus, although the overall characteristic pattern may be made up of a repeated portion that features a given pattern of rising and falling edges, different instances of this repeated portion may be disambiguated from one another by accounting for the sensor that generated each rising or falling edge.

Accordingly, one benefit of using multiple sensors 400-404 is the ability to determine the position of magnet ring 300 without magnet ring 300 completing as large a portion of a full rotation as might otherwise be done when using a single sensor. In some cases, data from sensors 400-404 could additionally or alternatively be used to provide redundancy to the correlation process. That is, each individual measure magnetic field pattern from sensors 400-404 could be separately correlated with the characteristic shift pattern to determine whether the same position of magnet ring 300 is determined across all three sensors or a majority thereof.

Thus, when a sensor experiences noise that would otherwise lead to an incorrect position determination, data from the other sensors may be used to mitigate the effect of this noise by allowing for the determined position to be validated or corrected. Notably, when magnet ring 300 forms part of a brushless motor, data from sensors 400-404 could also be used to determine a commutation sequence for the electrically conductive coils that form the brushless motor.

VI. ADDITIONAL EXAMPLE OPERATIONS

Figure 6:
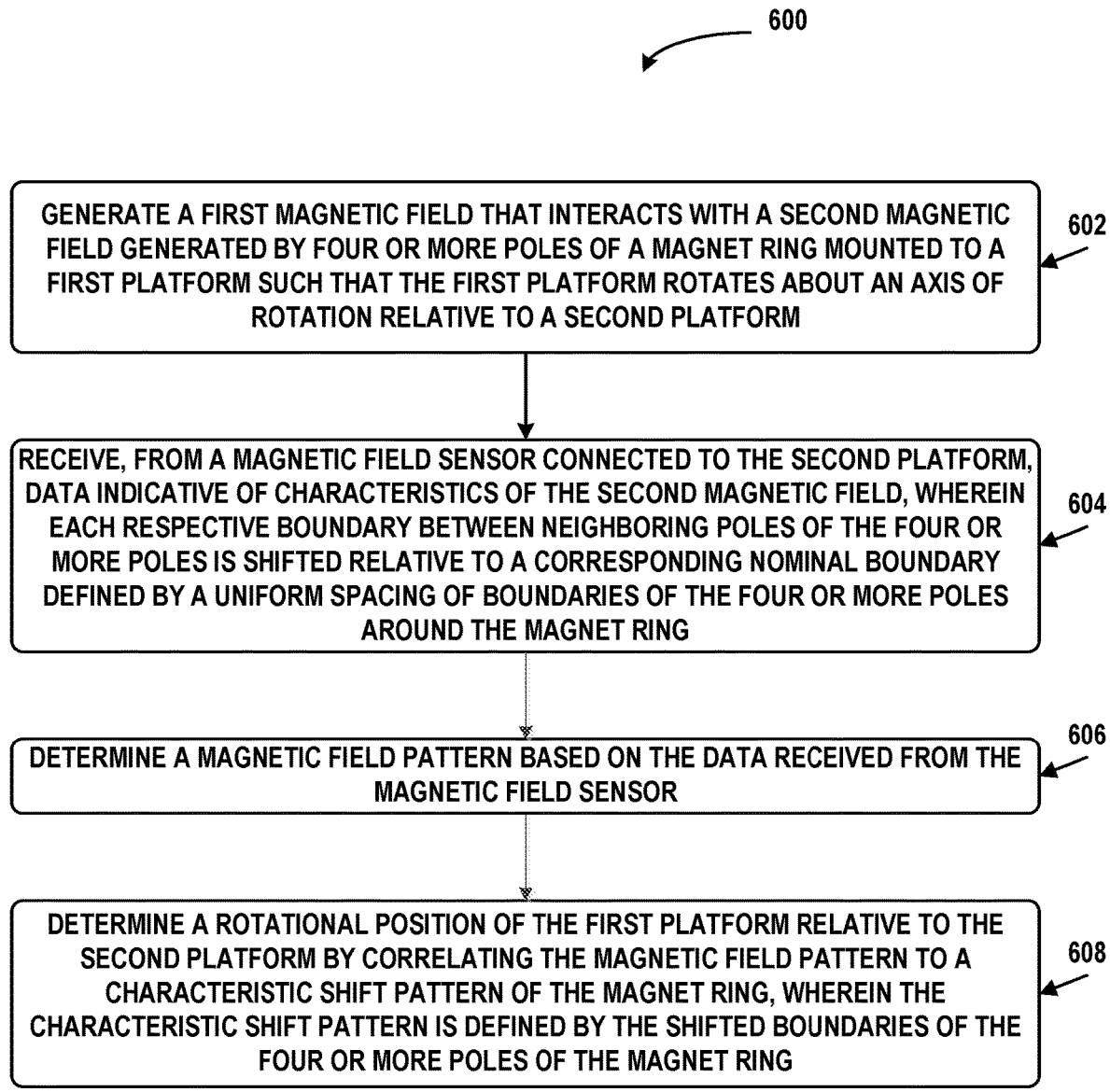
FIG. 6 illustrates a flow chart, in accordance with example embodiments.

FIG. 6 illustrates flow chart 600 of operations related to determining a rotational position of a magnet ring. The operations may be used with any of devices 100 or 200, or magnet ring 300. The operations may be carried out by, for example, controller 114, controller 134, or circuitry that is configured to perform the operations.

Block 602 may involve generating a first magnetic field that interacts with a second magnetic field generated by four or more poles of a magnet ring mounted to a first platform such that the first platform rotates about an axis of rotation relative to a second platform.

Block 604 may involve receiving, from a magnetic field sensor connected to the second platform, data indicative of characteristics of the second magnetic field. Each respective boundary between neighboring poles of the four or more poles is shifted relative to a corresponding nominal boundary defined by a uniform spacing of boundaries of the four or more poles around the magnet ring.

Block 606 may involve determining a magnetic field pattern based on the data received from the magnetic field sensor. In some embodiments, the magnetic field pattern may be alternatively referred to as a measured magnetic field pattern.

Block 608 may involve determining a rotational position of the first platform relative to the second platform by correlating the magnetic field pattern to a characteristic shift pattern of the magnet ring. The characteristic shift pattern is defined by the shifted boundaries of the four or more poles of the magnet ring.

In some embodiments, generating the first magnetic field may involve causing an electrical current to flow through an electrically conductive path included in the second platform.

In some embodiments, circuitry may be configured to (i) determine the magnetic field pattern based on data generated by the magnetic field sensor while the second platform rotates relative to the first platform and (ii) determine the rotational position of the first platform relative to the second platform by correlating the characteristic shift pattern to the measured magnetic field pattern.

In some embodiments, the four or more magnetized poles may be magnetized in alternating and opposite directions. The directions may include a first direction that is substantially parallel to the axis and a second direction opposite to the first direction. Substantially parallel may encompass, for example, up to a 10 degree deviation from exactly parallel.

In some embodiments, the four or more poles may include k poles. A nominal boundary between an nth pole and a subsequent pole neighboring the nth pole in a clockwise direction may be defined by $(360n)/(k)$.

In some embodiments, the four or more poles may include an even number of poles.

In some embodiments, each respective boundary between neighboring poles of the four or more poles may be shifted relative to the corresponding nominal boundary by a respective shift amount to provide a selected autocorrelation of the characteristic shift pattern.

In some embodiments, a maximum value of the selected autocorrelation may exceed a second highest value of the selected autocorrelation by at least a threshold value.

In some embodiments, the characteristic shift pattern for the magnet ring may include (i) a first type of transition representing a change in direction of the magnetic field from a first direction to a second direction and (ii) a second type of transition representing a change in direction of the magnetic field from the second direction to the first direction. A pattern of transitions of the first and second type within the magnetic field pattern may be determined. The rotational position of the first platform relative to the second platform may be determined by correlating (i) transitions of the first type within the magnetic field pattern to transitions of the first type within the characteristic shift pattern and (ii) transitions of the second type within the magnetic field pattern to transitions of the second type within the characteristic shift pattern.

In some embodiments, the second platform may be configured to rotate relative to the first platform at a constant angular velocity. Determining the rotational position of the first platform relative to the second platform may involve determining a period of time between detection of two adjacent boundaries within the magnetic field pattern. An angular displacement between the two adjacent boundaries may be determined based on the period of time. A measured shift for at least one of the two adjacent boundaries may be determined based on (i) the angular displacement and (ii) a nominal pole size defined by the uniform spacing of boundaries of the four or more poles along the magnet ring. A difference may be determined between the measured shift and one or more characteristic shifts within the characteristic shift pattern. An offset between (i) the characteristic shift pattern and (ii) the magnetic field pattern that minimizes the difference may be determined. The offset may indicate an angular position of the magnet ring relative to the magnetic field sensor.

In some embodiments, the magnetic field sensor may include a plurality of magnetic field sensors disposed asymmetrically about a circumference of the magnet ring. A composite characteristic shift pattern for the magnet ring may include a combination of magnetic field patterns expected to be detected by each of the plurality of magnetic field sensors based on the shifted boundaries. A respective magnetic field pattern may be determined for each of the plurality of magnetic field sensors. A composite magnetic field pattern may be determined by combining the respective magnetic field patterns determined for each of the plurality of magnetic field sensors. A rotational position of the first platform relative to the second platform may be determined by correlating the composite magnetic field pattern to the composite characteristic shift pattern.

In some embodiments, the composite characteristic shift pattern may be aperiodic during one rotation of the magnet ring.

VII. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An apparatus for determining a rotational position by correlating a characteristic shift pattern to a measured magnetic field pattern, the apparatus comprising:
   a first platform having a first side;
   a second platform having a second side that at least partially overlaps with the first side of the first platform, wherein the second platform is configured to rotate relative to the first platform about an axis;
   a magnet ring mounted to the first side of the first platform and centered around the axis, wherein the magnet ring comprises four or more magnetized poles that are substantially radially equidistant from the axis, wherein the four or more magnetized poles are positioned such that each respective boundary between neighboring poles of the four or more poles is angularly shifted relative to a corresponding nominal angular boundary defined by a uniform spacing of boundaries of the four or more poles around the magnet ring, and wherein the angularly shifted boundaries of the four or more poles define the characteristic shift pattern of the magnet ring; and
   a magnetic field sensor connected to the second side of the second platform and configured to generate the measured magnetic field pattern by measuring characteristics of a magnetic field generated by the four or more poles.

2. The apparatus of claim 1, further comprising circuitry configured to:
   determine the measured magnetic field pattern based on data generated by the magnetic field sensor while the second platform rotates relative to the first platform; and
   determine the rotational position of the first platform relative to the second platform by correlating the characteristic shift pattern to the measured magnetic field pattern.

3. The apparatus of claim 1, wherein the four or more magnetized poles are magnetized in alternating and opposite directions, wherein the directions comprise a first direction that is substantially parallel to the axis and a second direction opposite to the first direction.

4. The apparatus of claim 1, wherein the four or more poles comprise k poles, and wherein a nominal angular boundary between an nth pole and a subsequent pole neighboring the nth pole in a clockwise direction is defined by $(360n)/(k)$ degrees.

5. The apparatus of claim 1, wherein the four or more poles comprise an even number of poles.

6. The apparatus of claim 1, wherein each respective boundary between neighboring poles of the four or more poles is angularly shifted relative to the corresponding nominal angular boundary by a respective shift amount to provide a selected autocorrelation of the characteristic shift pattern.

7. The apparatus of claim 6, wherein a maximum value of the selected autocorrelation exceeds a second highest value of the selected autocorrelation by at least a threshold value.

8. The apparatus of claim 1, wherein the characteristic shift pattern of the magnet ring comprises (i) transitions of a first type representing a change in direction of the magnetic field from a first direction to a second direction and (ii) transitions of a second type representing a change in direction of the magnetic field from the second direction to the first direction, and wherein the apparatus further comprises circuitry configured to:

determine a pattern of transitions of the first and second type within the measured magnetic field pattern; and determine the rotational position of the first platform relative to the second platform by correlating (i) transitions of the first type within the measured magnetic field pattern to transitions of the first type within the characteristic shift pattern and (ii) transitions of the second type within the measured magnetic field pattern to transitions of the second type within the characteristic shift pattern.

9. The apparatus of claim 1, wherein the second platform is configured to rotate relative to the first platform at a constant angular velocity, wherein the apparatus further comprises circuitry configured to determine the rotational position of the first platform relative to the second platform by:

determining a period of time between detection of two adjacent boundaries within the measured magnetic field pattern;

determining an angular displacement between the two adjacent boundaries based on the period of time;

determining a measured shift for at least one of the two adjacent boundaries based on (i) the angular displacement and (ii) a nominal pole size defined by the uniform spacing of boundaries of the four or more poles along the magnet ring;

determining a difference between the measured shift and one or more characteristic shifts within the characteristic shift pattern; and determining, based on the difference, an offset between (i) the characteristic shift pattern and (ii) the measured magnetic field pattern that minimizes the difference, wherein the offset indicates an angular position of the magnet ring relative to the magnetic field sensor.

10. The apparatus of claim 1, wherein the magnetic field sensor comprises a plurality of magnetic field sensors disposed asymmetrically about a circumference of the magnet ring, wherein a composite characteristic shift pattern of the magnet ring comprises a combination of magnetic field patterns expected to be detected by each of the plurality of magnetic field sensors based on the angularly shifted boundaries, and wherein the apparatus further comprises circuitry configured to:

determine, for each of the plurality of magnetic field sensors, a respective magnetic field pattern;

determine a composite magnetic field pattern by combining the respective magnetic field patterns determined for each of the plurality of magnetic field sensors; and determine a rotational position of the first platform relative to the second platform by correlating the composite magnetic field pattern to the composite characteristic shift pattern.

11. The apparatus of claim 10, wherein the composite characteristic shift pattern is aperiodic during one rotation of the magnet ring.

12. A method comprising:

generating a first magnetic field that interacts with a second magnetic field generated by four or more poles of a magnet ring mounted to a first platform such that the first platform rotates about an axis of rotation relative to a second platform, wherein the four or more poles are substantially radially equidistant from the axis of rotation;

receiving, from a magnetic field sensor connected to the second platform, data indicative of characteristics of the second magnetic field, wherein each respective boundary between neighboring poles of the four or more poles is angularly shifted relative to a corresponding nominal angular boundary defined by a uniform spacing of boundaries of the four or more poles around the magnet ring;

determining a magnetic field pattern based on the data received from the magnetic field sensor; and determining a rotational position of the first platform relative to the second platform by correlating the magnetic field pattern to a characteristic shift pattern of the magnet ring, wherein the characteristic shift pattern is defined by the angularly shifted boundaries of the four or more poles of the magnet ring.

13. The method of claim 12, wherein generating the first magnetic field comprises causing an electrical current to flow through an electrically conductive path included in the second platform.

14. The method of claim 12, wherein the characteristic shift pattern of the magnet ring comprises (i) transitions of a first type representing a change in direction of the second magnetic field from a first direction to a second direction and (ii) transitions of a second type representing a change in direction of the second magnetic field from the second direction to the first direction, and wherein the method further comprises:

determining a pattern of transitions of the first and second type within the magnetic field pattern; and determining the rotational position of the first platform relative to the second platform by correlating (i) transitions of the first type within the magnetic field pattern to transitions of the first type within the characteristic shift pattern and (ii) transitions of the second type within the magnetic field pattern to transitions of the second type within the characteristic shift pattern.

15. The method of claim 12, wherein the second platform is configured to rotate relative to the first platform at a constant angular velocity, and wherein determining the rotational position of the first platform relative to the second platform comprises:

determining a period of time between detection of two adjacent boundaries within the magnetic field pattern;

determining an angular displacement between the two adjacent boundaries based on the period of time;

determining a measured shift for at least one of the two adjacent boundaries based on (i) the angular displacement and (ii) a nominal pole size defined by the uniform spacing of boundaries of the four or more poles along the magnet ring;

determining a difference between the measured shift and one or more characteristic shifts within the characteristic shift pattern; and determining, based on the difference, an offset between (i) the characteristic shift pattern and (ii) the magnetic field pattern that minimizes the difference, wherein the offset indicates an angular position of the magnet ring relative to the magnetic field sensor.

16. The method of claim 12, wherein the magnetic field sensor comprises a plurality of magnetic field sensors disposed asymmetrically about a circumference of the magnet ring, wherein a composite characteristic shift pattern of the magnet ring comprises a combination of magnetic field patterns expected to be detected by each of the plurality of magnetic field sensors based on the angularly shifted boundaries, and wherein the method further comprises:

determining, for each of the plurality of magnetic field sensors, a respective magnetic field pattern;

determining a composite magnetic field pattern by combining the respective magnetic field patterns determined for each of the plurality of magnetic field sensors; and determining the rotational position of the first platform relative to the second platform by correlating the composite magnetic field pattern to the composite characteristic shift pattern.

17. The method of claim 16, wherein the composite characteristic shift pattern is aperiodic during one rotation of the magnet ring.

18. A non-transitory computer-readable storage medium having stored thereon instructions that, when executed by a computing device, cause the computing device to perform operations comprising:

providing instructions to generate a first magnetic field by causing an electrical current to flow through an electrically conductive path, wherein the first magnetic field interacts with a second magnetic field generated by four or more poles of a magnet ring mounted to a first platform such that the first platform rotates about an axis of rotation relative to a second platform, wherein the electrically conductive path is included in the second platform, and wherein the four or more poles are substantially radially equidistant from the axis of rotation;

receiving, from a magnetic field sensor connected to the second platform, data indicative of characteristics of the second magnetic field, wherein each respective boundary between neighboring poles of the four or more poles is angularly shifted relative to a corresponding nominal angular boundary defined by a uniform spacing of boundaries of the four or more poles around the magnet ring;

determining a magnetic field pattern based on the data received from the magnetic field sensor; and determining a rotational position of the first platform relative to the second platform by correlating the magnetic field pattern to a characteristic shift pattern of the magnet ring, wherein the characteristic shift pattern is defined by the angularly shifted boundaries of the four or more poles of the magnet ring.

19. The non-transitory computer-readable storage medium of claim 18, wherein the characteristic shift pattern of the magnet ring comprises (i) transitions of a first type representing a change in direction of the second magnetic field from a first direction to a second direction and (ii) transitions of a second type representing a change in direction of the second magnetic field from the second direction to the first direction, and wherein the operations further comprise:

determining a pattern of transitions of the first and second type within the magnetic field pattern; and determining the rotational position of the first platform relative to the second platform by correlating (i) transitions of the first type within the magnetic field pattern to transitions of the first type within the characteristic shift pattern and (ii) transitions of the second type within the magnetic field pattern to transitions of the second type within the characteristic shift pattern.

20. The non-transitory computer-readable storage medium of claim 18, wherein the magnetic field sensor comprises a plurality of magnetic field sensors disposed asymmetrically about a circumference of the magnet ring, wherein a composite characteristic shift pattern of the magnet ring comprises a combination of magnetic field patterns expected to be detected by each of the plurality of magnetic field sensors based on the angularly shifted boundaries, and wherein the operations further comprise:

determining, for each of the plurality of magnetic field sensors, a respective magnetic field pattern;

determining a composite magnetic field pattern by combining the respective magnetic field patterns determined for each of the plurality of magnetic field sensors; and determining the rotational position of the first platform relative to the second platform by correlating the composite magnetic field pattern to the composite characteristic shift pattern.

\* \* \* \* \*